US012242847B2

(12) United States Patent
El Khatib et al.

(10) Patent No.: US 12,242,847 B2
(45) Date of Patent: Mar. 4, 2025

(54) FAST MULTIPLE CORE METHOD AND SYSTEM FOR CHAINING ISOGENY COMPUTATIONS

(71) Applicant: PQSecure Technologies, LLC, Boca Raton, FL (US)

(72) Inventors: Rami El Khatib, Boca Raton, FL (US); Brian C. Koziel, Plano, TX (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/787,394

(22) PCT Filed: Aug. 13, 2021

(86) PCT No.: PCT/US2021/045852
§ 371 (c)(1),
(2) Date: Feb. 16, 2023

(87) PCT Pub. No.: WO2023/018418
PCT Pub. Date: Feb. 16, 2023

(65) Prior Publication Data
US 2024/0184573 A1    Jun. 6, 2024

(51) Int. Cl.
*G06F 9/30* (2018.01)
(52) U.S. Cl.
CPC ............................... *G06F 9/30036* (2013.01)
(58) Field of Classification Search
CPC ................................................ G06F 9/30036
See application file for complete search history.

(56) References Cited

U.S. PATENT DOCUMENTS 10,812,265 B1   10/2020   de Quehen et al.
2009/0074178 A1*  3/2009   Longa ..................... G06F 7/725
                                                                380/28
(Continued)

OTHER PUBLICATIONS

Koziel et al."Fast Hardware Architectures for Super singular isogeny Difie-Heilman Key Exchange on FPGA" In: Progress in Cryptology—Indocrypt 2016. Indocrypt 2016, [online] [retrieved on Oct. 9, 2021 (Oct. 9, 2021)] Retrieved from the internet < URL: https://link.springer.eom/chapter/10.1007/978-3-319-49890/\_11 >, entire document.

(Continued)

*Primary Examiner* — Michael D. Yaary
(74) *Attorney, Agent, or Firm* — Johnson | Dalal; Mark C. Johnson

(57) ABSTRACT

A computer processing system and method for computing large-degree isogenies having a computer processor resident on an electronic computing device operably configured to execute computer-readable instructions programmed to perform a large-degree isogeny operation by chaining together a plurality of scalar point multiplications, a plurality of isogeny computations, and a plurality of isogeny evaluations. The computer processor has a plurality of computational cores each with an arithmetic logic unit (ALU) operably configured to perform computations within the large-degree isogeny and with a controller operably configured to execute a sequence of core computer-readable instructions to feed data into and out of the ALU in each respective plurality of computational cores that include a primary computational core operably configured to perform the plurality of scalar point multiplications and the plurality of isogeny computations and a secondary computational core operably configured to perform the plurality of isogeny evaluations.

17 Claims, 8 Drawing Sheets

(56) References Cited

U.S. PATENT DOCUMENTS

2012/0008780 A1\* 1/2012 Al-Somani ............ G06F 7/725
 380/255
2018/0323973 A1 11/2018 Soukharev
2020/0014534 A1 1/2020 Koninklijke
2020/0259648 A1 8/2020 Koziel

OTHER PUBLICATIONS

Azarderakhsh et al., A High-Performance and Scalable Hardware Architecture for Isogeny-Based Cryptography, Nov. 2018, vol. 67, pp. 1594-1608.

\* cited by examiner

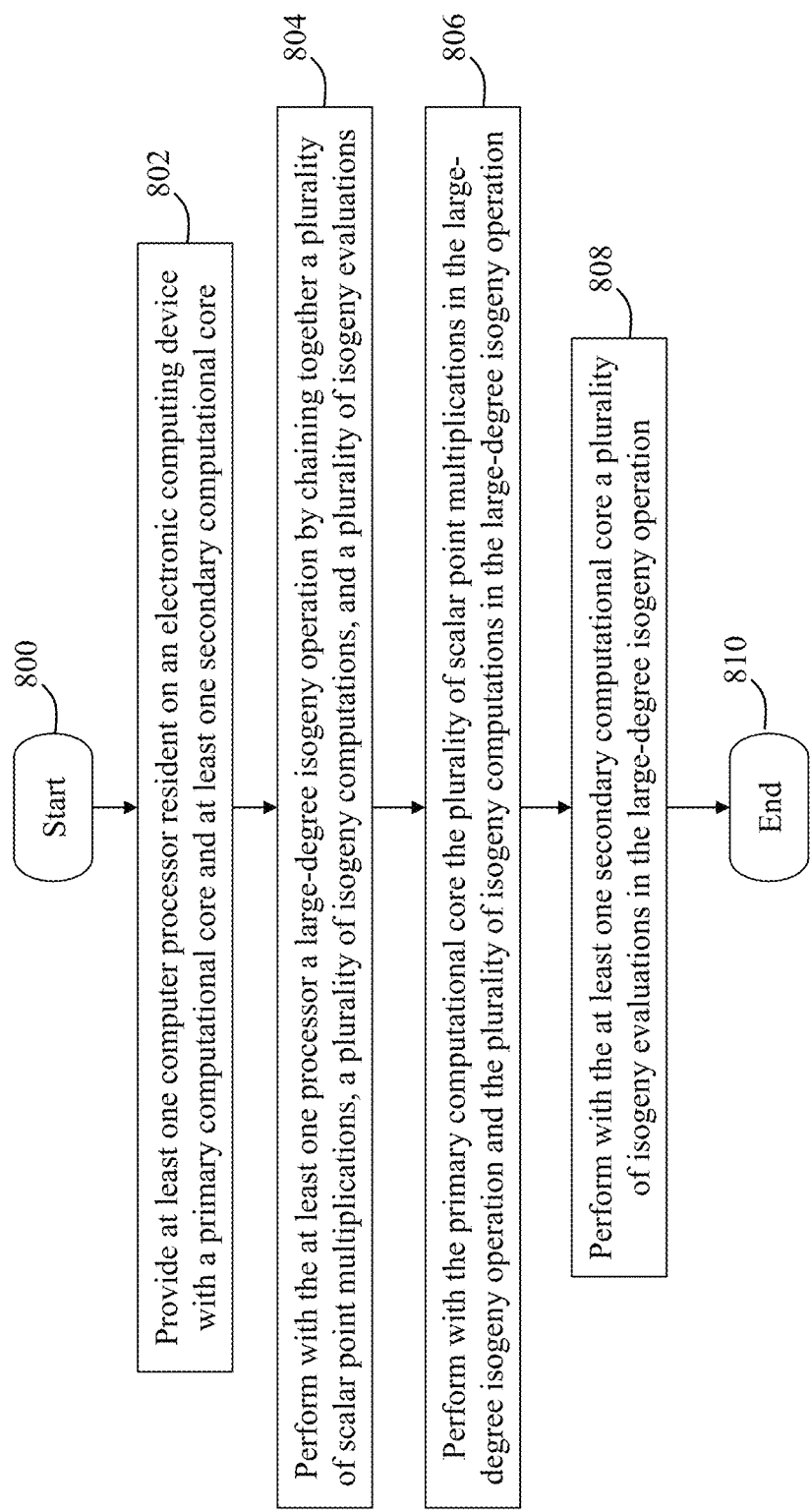

FAST MULTIPLE CORE METHOD AND SYSTEM FOR CHAINING ISOGENY COMPUTATIONS

FIELD OF THE INVENTION

The present invention relates generally to hardware, systems, implementations of hardware, and methods directed towards efficiently chaining isogeny computations by splitting the workload between multiple computational cores.

BACKGROUND OF THE INVENTION

Modern day cryptosystems provide the backbone for secure communications over the Internet, between devices, and so much more. Cryptography utilizes complex mathematical and computational conjectures to prove that it is infeasible to break difficult foundational problems. More generally, cryptography utilizes these difficult foundational problems to provide information security assurances such as data confidentiality, data integrity, authentication, and non-repudiation.

Public-key cryptography is a branch of cryptology that utilizes a public and private key between multiple parties for applications such as key establishment or digital signatures. More recently, there has been a push to transition to public-key cryptographic algorithms that are infeasible to break by both classical and (soon to emerge) quantum computers, creating a new set of algorithms considered post-quantum. One particular problem within post-quantum cryptography is based on isogenies of elliptic curves. Here, it is conjectured that given two isogenous elliptic curves, it is difficult even for quantum computers to determine the isogenous mapping between the two elliptic curves.

For efficiency, isogeny-based cryptography typically uses isogeny computations that are constructed by chaining together a sequence of base degree isogenies, that we call a "large-degree isogeny." This large-degree isogeny computation requires a complicated sequence of elliptic curve point arithmetic and isogeny arithmetic that has gone through several iterations of algorithmic optimizations. In the scenario where multiple processing cores are available, it is still unclear what the best option may be for implementing this operation efficiently.

Therefore, a need exists to overcome the problems with the prior art as discussed above.

SUMMARY OF THE INVENTION

The invention provides a hardware, system, implementation, and method for efficiently computing large-degree isogenies with multiple processing cores. Here, we define an "efficient" implementation of a large-degree isogeny as one that requires less time than the state-of-the-art.

The invention provides a fast multiple core method and system for chaining isogeny computations that overcomes the hereinafore-mentioned disadvantages of the heretofore-known devices and methods of this general type. With the foregoing and other objects in view, there is provided, in accordance with the invention, a computer processing system for computing large-degree isogenies that includes at least one computer processor resident on an electronic computing device and operably configured to execute computer-readable instructions programmed to perform a large-degree isogeny operation by chaining together a plurality of scalar point multiplications, a plurality of isogeny computations, and a plurality of isogeny evaluations, the least one computer processor having a plurality of computational cores each with an arithmetic logic unit operably configured to perform computations within the large-degree isogeny and with a controller operably configured to execute a sequence of core computer-readable instructions to feed data into and out of the arithmetic logic unit in each respective plurality of computational cores. The plurality of computational cores also includes a primary computational core operably configured to perform the plurality of scalar point multiplications in the large-degree isogeny operation and the plurality of isogeny computations in the large-degree isogeny operation and at least one secondary computational core operably configured to perform the plurality of isogeny evaluations in the large-degree isogeny operation.

In accordance with a further feature of the present invention, the primary computational core is operably configured to perform at least one of the plurality of isogeny evaluations in the large-degree isogeny operation.

In accordance with yet another feature, an embodiment of the present invention also includes the plurality of isogeny evaluations having a plurality of pivot points each respectively utilized as an input in the plurality of isogeny evaluations in the large-degree isogeny operation, wherein the primary computational core is operably configured to perform one of the at least one of the plurality of isogeny evaluations on a lowest elliptic curve point order of the plurality of pivot points in the large-degree isogeny operation.

In accordance with yet another feature of the present invention, the at least one secondary computational core is operably configured to perform at least one of the plurality of scalar point multiplications in the large-degree isogeny operation.

In accordance with a further feature of the present invention, the at least one of the plurality of scalar point multiplications in the large-degree isogeny operation generates at least one pivot point utilized as an input in at least one of the plurality of isogeny evaluations in the large-degree isogeny operation.

In accordance with an additional feature, an embodiment of the present invention also includes the at least one computer processor having at least one memory unit operably and communicatively coupled to the plurality of computational cores and operably configured to store intermediate values within the large-degree isogeny operation from the plurality of computational cores.

In accordance with yet another feature, an embodiment of the present invention also includes the at least one computer processor having a first memory unit operably and communicatively coupled to the primary computational core and operably configured to store intermediate values within the large-degree isogeny operation from the primary computational core and a second memory unit operably and communicatively coupled to the secondary computational core and operably configured to store intermediate values within the large-degree isogeny operation from the secondary computational core, wherein the first memory unit and the second memory unit are both operably configured to exchange data between each other.

In accordance with an exemplary feature of the present invention, the arithmetic logic unit in the at least one secondary computational core has a performance different from a performance of the arithmetic logic unit in the primary computational core.

In accordance with a further feature of the present invention, the large-degree isogeny operation is performed as part of an isogeny-based cryptosystem utilizing the computer processor resident on the electronic computing device.

Also in accordance with the present invention, a computer-implemented method for computing large-degree isogenies is disclosed that includes the steps of providing at least one computer processor resident on an electronic computing device with a primary computational core and at least one secondary computational core, performing with the at least one processor a large-degree isogeny operation by chaining together a plurality of scalar point multiplications, a plurality of isogeny computations, and a plurality of isogeny evaluations, performing with the primary computational core the plurality of scalar point multiplications in the large-degree isogeny operation and the plurality of isogeny computations in the large-degree isogeny operation, and performing with the at least one secondary computational core a plurality of isogeny evaluations in the large-degree isogeny operation.

Although the invention is illustrated and described herein as embodied in a fast multiple core method and system for chaining isogeny computations, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 8 is a process-flow diagram depicting a computer-implemented method for computing large-degree by chaining together multiple isogenies through multiple computational cores in accordance with one embodiment of the present invention.

DETAILED DESCRIPTION

Figure 1:
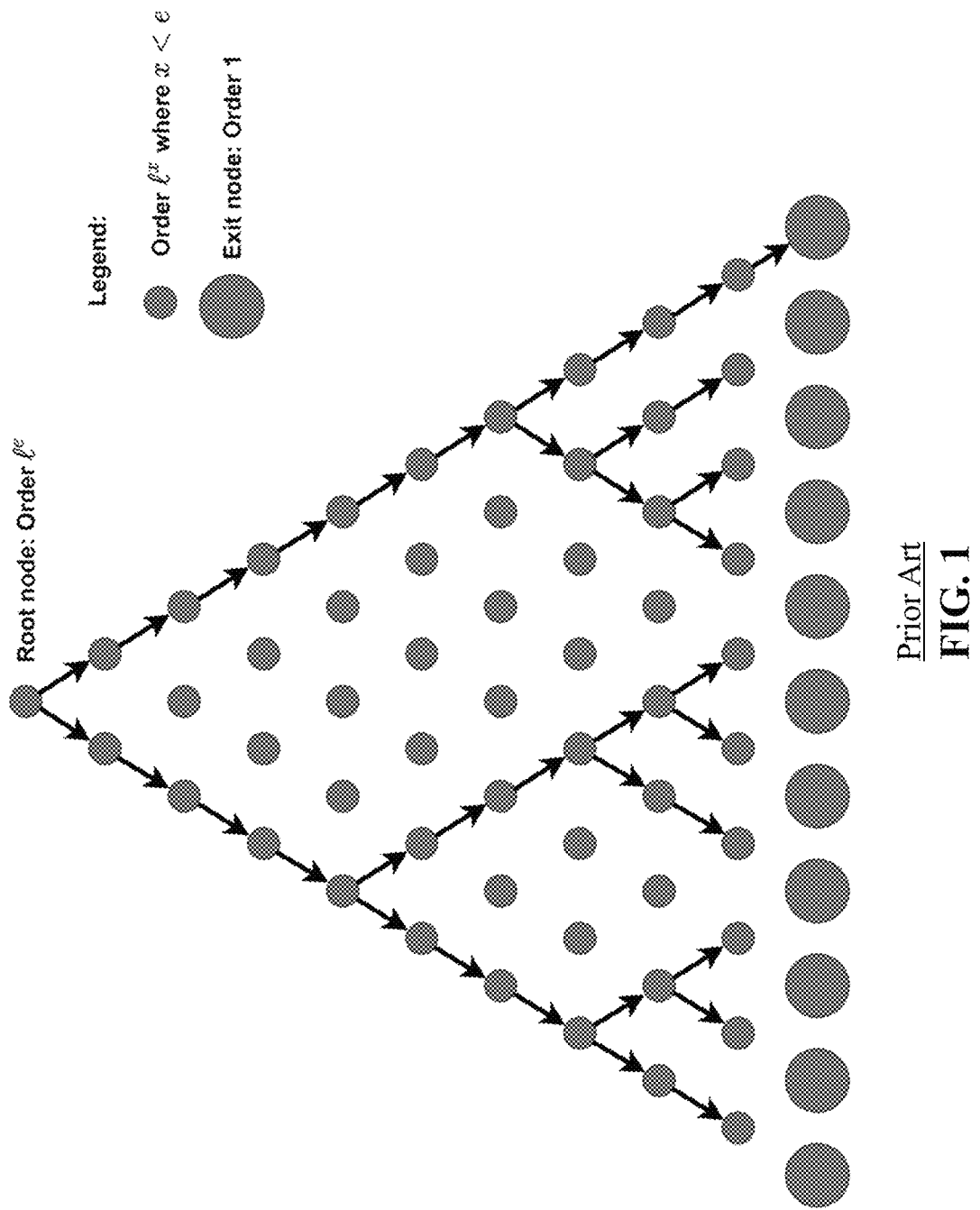
FIG. 1 is a diagram depicting a directed acyclic graph for visualizing the large-degree isogeny computation. Starting from a root node, the goal is to traverse to the leaf nodes to compute an isogeny where there is a cost to move left or right. This represents the state-of-the-art for efficient computation of large-degree isogenies.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a hardware, system, implementation, and method for efficiently computing large-degree isogenies with multiple processing cores. In cryptography, the primary known application for these large-degree isogenies is for isogeny-based cryptosystems which have been shown to provide key exchange and digital signature schemes. Furthermore, these isogeny-based cryptosystems have been constructed by using isogenies on elliptic curves. This current invention applies to any scenario where a large-degree isogeny, composed of a chain of base-degree isogenies, is used. This isogeny is not limited to just elliptic curves. Moreover, the method and system illustrated here is intended to perform large-degree isogenies much faster by making use of additional processing cores.

An isogeny is defined as a morphism of algebraic groups that is surjective and has a finite kernel. When applied to elliptic curves, an isogeny is a morphism between elliptic curves that preserves the basepoints. For current cryptosystems, we utilize elliptic curves defined over a finite field. Thus, an elliptic curve isogeny $\varphi:E \to E'$ over a finite field $F_q$ is defined as a non-constant rational map from $E(F_q)$ to $E'(F_q)$ that preserves the point at infinity. This is a mapping of points from one elliptic curve to another that changes the elliptic curve's isomorphism class. A unique isogeny can be computed by Velu's formulas over a kernel, $\varphi:E \to E/\langle \text{kernel} \rangle$. The degree of an isogeny is its degree as a rational map. Bigger degree isogenies are generally more computationally expensive. To better explain this invention, we define an isogeny computation as a mapping from elliptic curve to an isogenous elliptic curve and an isogeny evaluation as a mapping from a point on an elliptic curve to the corresponding point on an isogenous elliptic curve.

Examples of isogeny-based cryptosystems include, but are not limited to, the supersingular isogeny Diffie-Hellman (SIDH) key exchange, the commutative supersingular isogeny Diffie-Hellman (CSIDH) key exchange, the supersingular isogeny key encapsulation (SIKE) mechanism, and the short quaternion and isogeny signature (SQISign). The computational conjecture of these schemes is that it is easy to compute an isogeny $\varphi$ between two elliptic curves given a kernel, but it is difficult to find the isogeny between two elliptic curves.

As a first example, we explain this invention for SIDH and SIKE which compute a large-degree isogeny using the same method. For efficiency, SIDH and SIKE make use of primes of the form $\ell_a^{e_a} \ell_b^{e_b} f \pm 1$, where $\ell_a$ and $\ell_b$ are small primes and f is chosen to make the number prime. For a key establishment session between Alice and Bob, Alice computes the large-degree isogeny $\ell_a^{e_a}$ and Bob computes the large-degree isogeny $\ell_b^{e_b}$. For efficiency, these large-degree isogenies are computed as a chain of smaller isogenies. For instance, Alice will compute the large-degree isogeny $\ell_a^{e_a}$ as an $e_a$-length chain of $\ell_a$ isogenies. This is the most intense computation in SIDH and SIKE and can be optimized. $\ell_a$ and $\ell_b$ are small primes to keep the scheme efficient. For instance, $\ell_a=2$ and $\ell_b=3$ are the most frequently used primes since they are the most efficient.

For SIDH and SIKE, the large-degree isogeny is computed as follows. Given a point R of order $\ell^e$, the large-degree isogeny tree problem is to compute the large-degree isogeny as efficiently as possible. Starting on curve $E_0$ with kernel point $R_0$ of order $\ell^e$, the large-degree isogeny can be computed iteratively by initializing $E_0=E$ and $R_0=R$ and then computing $0 \le i < e$ iterations of degree-$\ell$ isogenies $\varphi_i:E_i \to E_{i+1}$ with kernel $[\ell^{e-i-1}]R_i$, and then updating $R_{i+1}=\varphi_i(R_i)$. This computational problem can be visualized as a directed acyclic graph, similar to a binary tree, which is shown in FIG. 1. Here, we start at a root node which has order $\ell^e$. To traverse this graph, a point multiplication by $\ell$ moves to the left an $\ell$-isogeny evaluation moves to the right. The goal is to compute an $\ell$-isogeny at each of the leaf nodes which have an order of $\ell$. Any number of pivot points, or strategic points can be stored and pushed through $\ell$-isogenies to reduce the number of point multiplications and isogeny evaluations that are computed.

A strategy is a sequence of point multiplications, isogeny evaluations, and isogeny computations that compute the large-degree isogeny. There is no advantage to traversing each node. An optimal strategy is one of least cost. This optimal strategy depends on the relative cost of scalar point multiplication by $\ell$ and $\ell$-degree isogeny evaluations. Pivot points are stored points that can reduce the cost of traversal but will require an $\ell$-degree isogeny evaluation after each isogeny computation. The optimal strategy for a large tree can be found by combining the optimal strategy of both subtrees.

Typically, the optimal strategy is created based on the assumption that a single processor is performing the operations iteratively. However, parts of the large-degree isogeny can be parallelized to achieve speedups. For the sake of this invention, we consider a computational core as one that can perform any operations for the large-degree isogeny. In the context of isogenies of elliptic curves for cryptography, this is typically a series of finite field operations to compute point arithmetic or isogeny results.

In the system view, a computational core is composed of an arithmetic logic unit, controller, and sequence of instructions. The arithmetic logic unit (ALU) performs any useful arithmetic operations, which could be low-level finite field arithmetic, point arithmetic, or isogeny arithmetic. The controller acts as the logical core of the computational unit by feeding any inputs to the ALU, reading any outputs, and managing the control flow. The sequence of instructions dictates a set of arithmetic or point arithmetic operations needed to achieve the necessary large-degree isogeny computation. From this definition, a computational core can be seen as a software processor or a variety of hardware accelerator systems. There are no limitations to the relative performance or capabilities of the cores.

Figure 2:
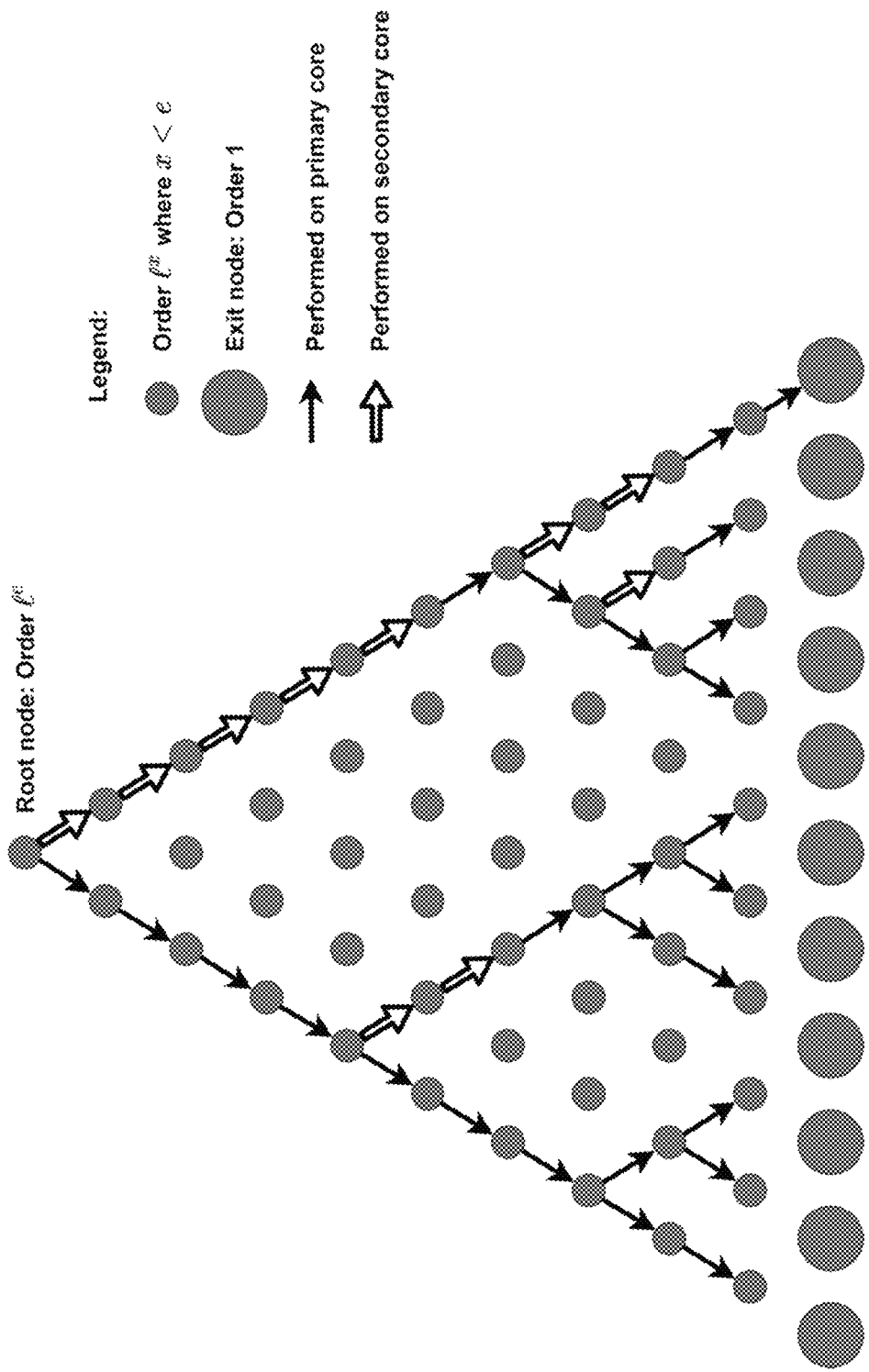
FIG. 2 is a diagram depicting a directed acyclic graph where the large-degree isogeny is efficiently computed by two computational cores. After an isogeny is computed using the primary core, the secondary core can compute isogeny evaluations while the primary core is computing the next isogeny computation, achieving a speedup by using parallelism.

One direct example of this invention is to consider a two-core system with a primary processor and a secondary processor computing a large-degree isogeny as is shown in FIG. 2. Within the large-degree isogeny for SIDH and SIKE, we compute the large-degree isogeny for an input point R of order $\ell^e$, with the following sequence: 1) perform point multiplications by $\ell$ while storing any pivot points; 2) perform an $\ell$-degree isogeny computation; 3) perform an $\ell$-degree isogeny evaluation on all stored pivot points. For a large-degree isogeny of order $\ell^e$, there are approximately e iterations of this sequence. Only the last iteration does not need to use step #3. The simple goal of this two-core system is to perform steps #1 and #2 with the primary processor and step #3 with the secondary processor. Interestingly, the isogeny evaluation results are not immediately needed and can be performed in parallel. Only the isogeny evaluation of one pivot point (typically the one of least order) is needed to perform steps #1 and #2. FIG. 2 shows one example of this approach where the primary computational core performs all computations with filled-in arrows and a secondary core (can also be more than one) performs all computations with hollow arrows.

The large-degree isogeny strategies used in FIG. 1 and FIG. 2 are identical, but a secondary core is used to perform some computations whose results are not immediately required. In this toy example, there are 10 $\ell$-isogeny computations, 16-point multiplications by $\ell$, and 19 $\ell$-degree isogeny evaluations. When split between multiple cores, the primary computational core performs 10 $\ell$-isogeny computations, 16-point multiplications by $\ell$, and 9 $\ell$-degree isogeny evaluations while the secondary core performs 10 $\ell$-degree isogeny evaluations. Thus, the cost of these 10 $\ell$-degree isogeny evaluations are done by the secondary core while the primary core is performing its operations. If the performance between the primary and secondary processors is optimized so that the primary core never has to wait for the secondary core to finish its operations, then these 10 $\ell$-degree isogeny evaluations are effectively interleaved in the large-degree isogeny operation.

As a further example, we compare a state-of-the-art implementation of this large-degree isogeny for the isogeny $3^{137}$ as is used for SIDH and SIKE systems using the prime $2^{216}3^{137}-1$. When constructing a strategy, the relative costs of point multiplication by $\ell$ and $\ell$-degree isogeny evaluations are used as this dictates the cost to traverse the large-degree isogeny tree structure. For one example, a point multiplication by 3 is approximately twice as slow as a 3-degree isogeny evaluation. In the two-core example, the primary processor is responsible for the point multiplications by 3, a 3-degree isogeny computation, and a 3-degree isogeny evaluation, while the secondary processor is responsible for the 3-degree isogeny evaluations. To accomplish a high degree of parallelism, let us say that 8 pivot points are stored for use with the large-degree isogeny. If the primary and secondary cores are equal in speed, then that means that if 3- or 4-point multiplications by 3 are used between each 3-degree isogeny computation, that the primary and secondary cores will finish an iteration at about the same time. This parallelism effectively interleaves the isogeny evaluation costs, resulting in a significantly faster large-degree isogeny. New and faster large-degree isogeny strategies can be made to accelerate the large-degree isogeny computation.

Figure 3:
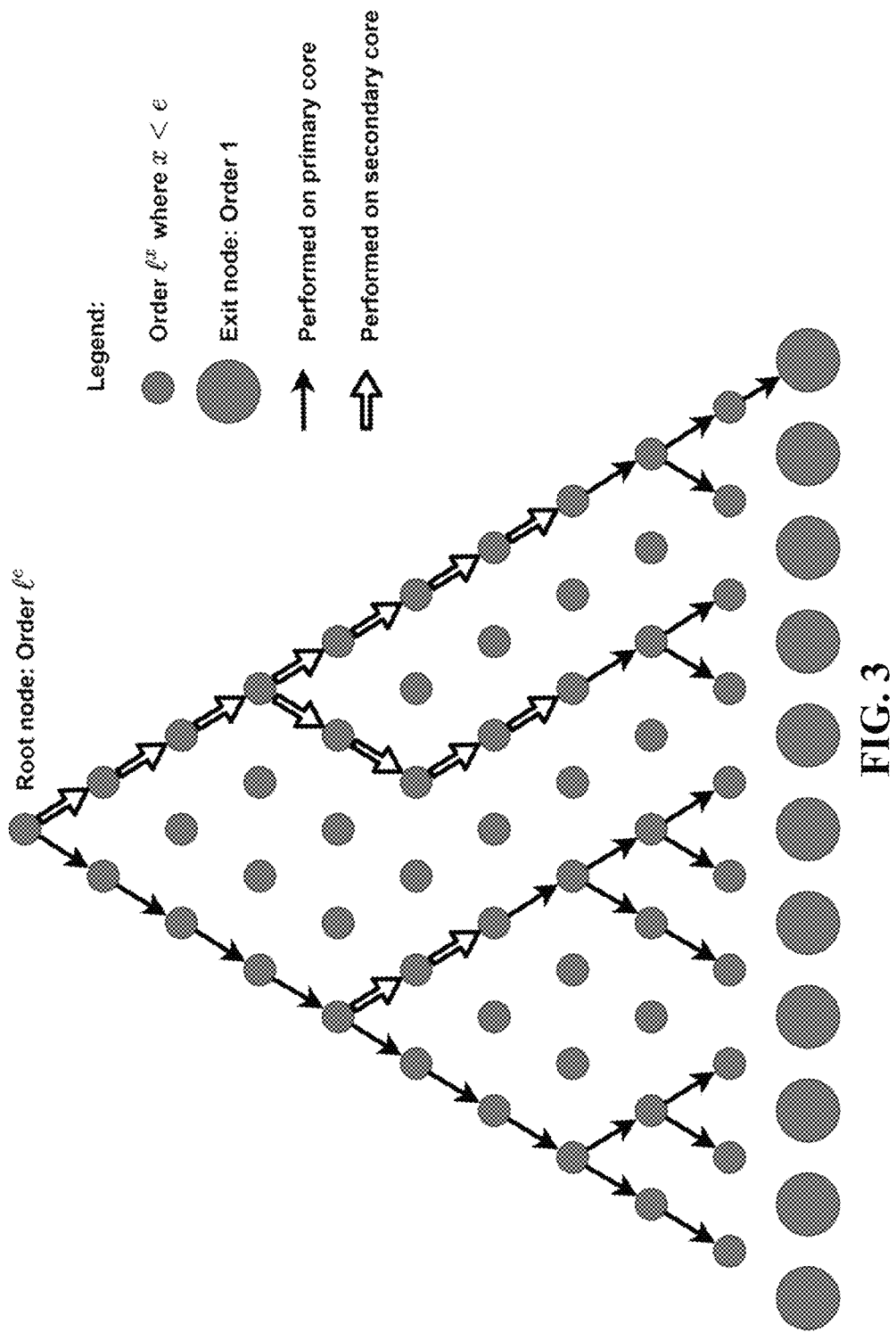
FIG. 3 is a diagram depicting a directed acyclic graph where the large-degree isogeny is again efficiently computed by two computational cores. After an isogeny is computed using the primary core, the secondary core can compute isogeny evaluations and scalar point multiplications while the primary core is computing the next isogeny computation, achieving a speedup by using parallelism.

FIG. 3 shows a further embodiment of this invention where the secondary coprocessor can compute point multiplications by $\ell$ in addition to $\ell$-degree isogeny evaluations. With the ability to perform the point multiplication by $\ell$ operation, a secondary core can compute different pivot points. For instance, comparing the strategies of FIG. 2 and FIG. 3 shows that only the right-side of the strategy is different. FIG. 3 shows that the secondary core can compute two-point multiplications by $\ell$ to store a new pivot point that can save one point multiplication by $\ell$ that would have been performed by the primary core. Optimizations like this give more options for strategies that may be faster given the computational resources available and relative cost of point and isogeny operations.

In another example, let us consider CSIDH which uses a prime of the form $\ell_0\ell_1 \ldots \ell_{n-1}f\pm1$ such that each $\ell_i$ is a small prime and f is a small cofactor to make the number prime. As one well-versed in the art will appreciate, CSIDH uses this prime form to efficiently compute a group action over supersingular elliptic curves. Similar to SIDH and SIKE, one can compute the large-degree isogeny of degree $\ell_0\ell_1 \ldots \ell_{n-1}$ by splitting the group action into the sequence: 1) perform point multiplications by all but one $\ell_i$ while storing any pivot points; 2) perform an $\ell_i$-degree isogeny computation; 3) perform an $\ell_i$-degree isogeny evaluation on all stored pivot points. In this case, the $\ell$ term is variable, but the same procedure is used. Again, in a two-core system, the primary processor will perform steps #1 and #2 and the secondary processor will perform step #3 in parallel. With the many different orders of points needed for isogeny computations, storing more pivot points and interleaving the cost to perform isogeny evaluations will greatly reduce the latency of the large-degree isogeny.

Figure 4:
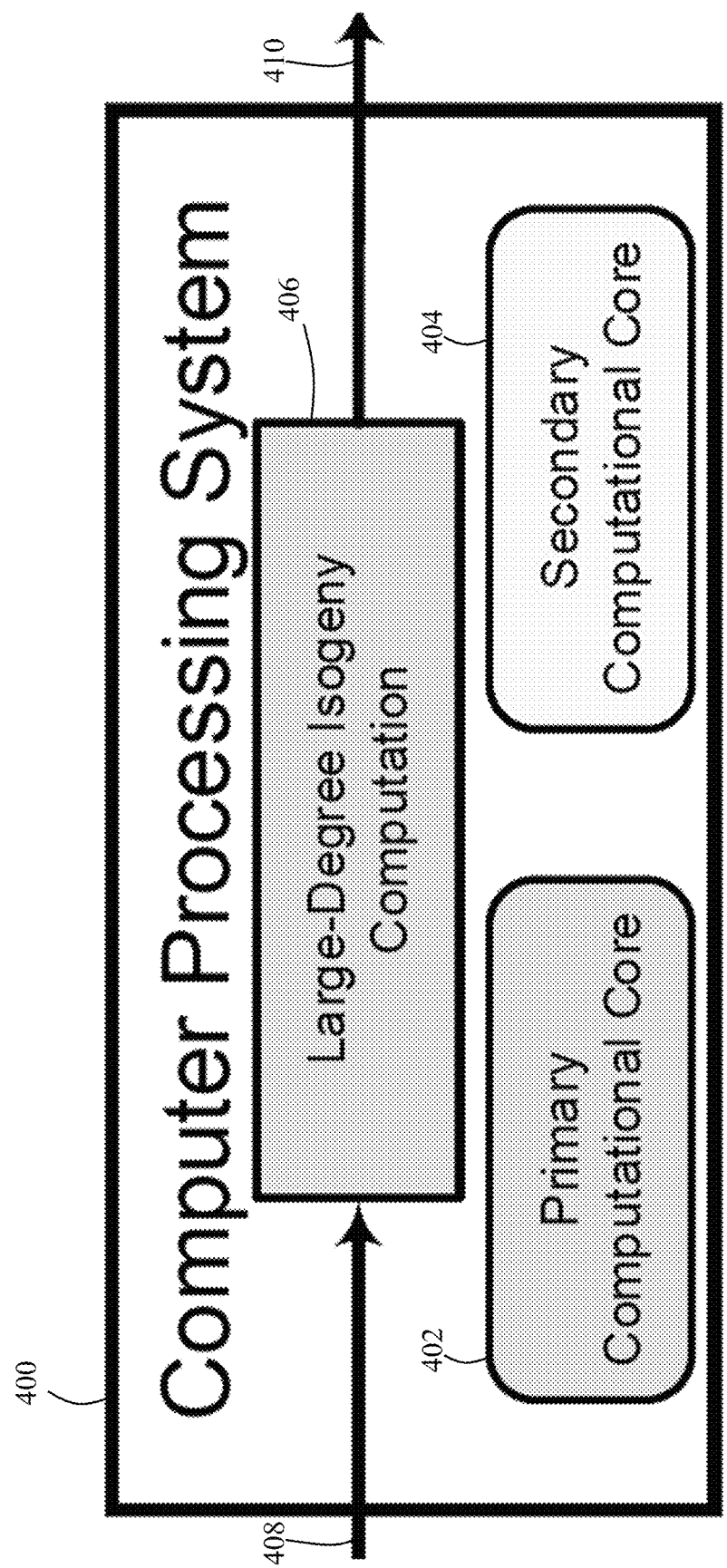
FIG. 4 is a schematic depicting an architecture for this invention, namely that upon receiving inputs for a large-degree isogeny will compute a large-degree isogeny by using a primary and secondary computational core and out the large-degree isogeny outputs.

The first embodiment of this invention it to perform a large-degree isogeny operation that is composed of a chain of small degree isogenies by splitting the workload between multiple processing cores. A simple high-level view of this architecture is shown in FIG. 4. Upon receiving large-degree isogeny inputs 408, the computer processing system will compute the large-degree isogeny operation by chaining together isogenies of a base degree. This requires a sequence of isogeny computations, isogeny evaluations, and scalar point multiplications, which are split between a primary and secondary computational core. The primary computational core is configured to perform scalar point multiplications, isogeny computations, and isogeny evaluations within the large-degree isogeny operation. Upon receiving inputs 406 for a large-degree isogeny a large-degree isogeny will be computed by using a primary and secondary computational core and output large-degree isogeny outputs 410.

Figure 5:
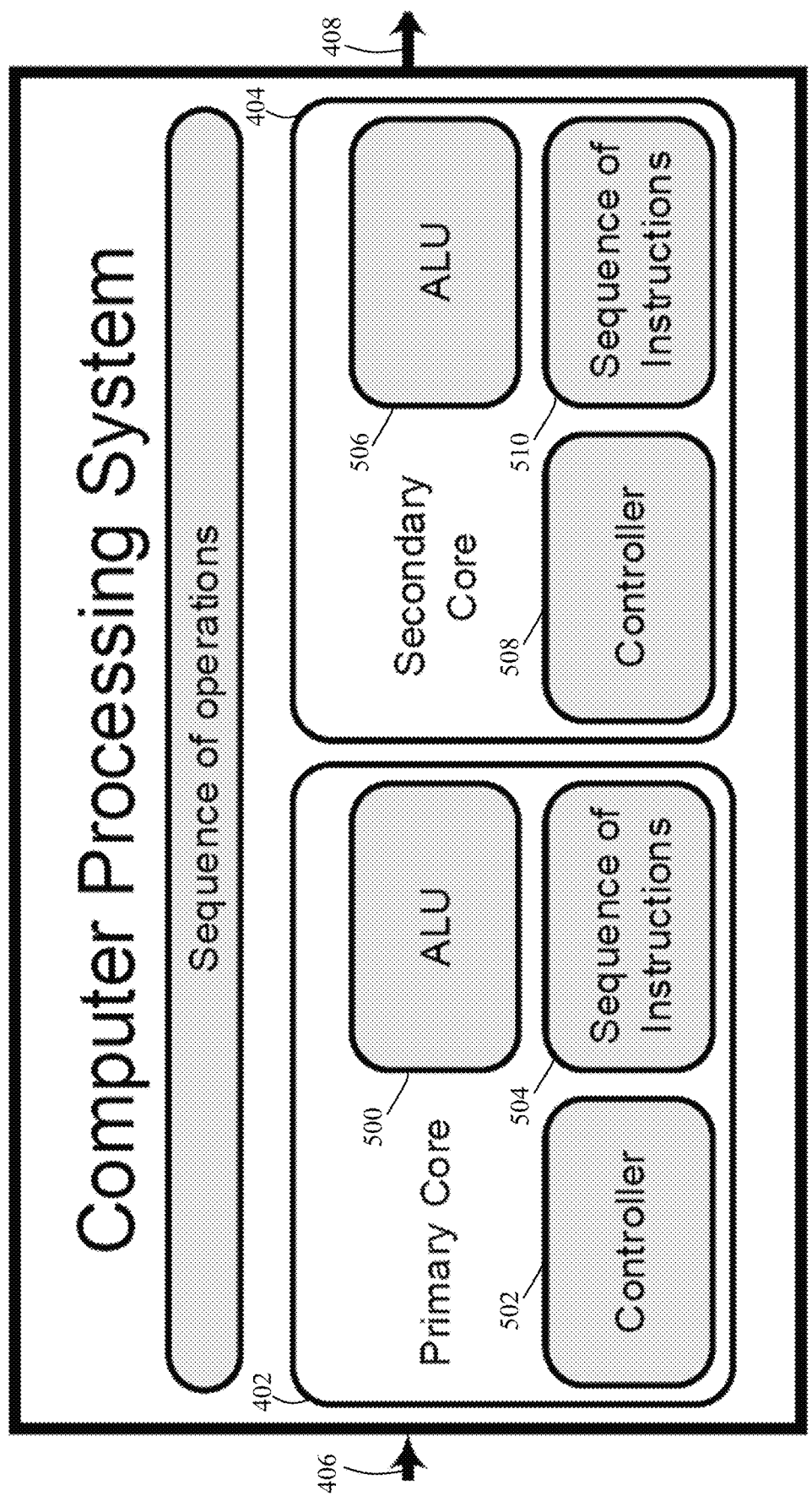
FIG. 5 is a schematic depicting an architecture for this invention, namely a computer processor resident on an electronic computing device operably configured to compute a large-degree isogeny by executing a sequence of operations across a primary core and secondary core. Each computational core has its own arithmetic logic unit (ALU), controller, and sequence of instructions.

As is shown in FIG. 5, each computational core is composed of an arithmetic logic unit (ALU), controller, and sequence of instructions. Specifically, the primary core 402 includes an ALU 500, a controller 502, and a sequence of instructions 504. Similarly, the one or more secondary cores 404 include an ALU 506, a controller 508, and a sequence of instructions 510. The ALU performs any lower-level computations for the point or isogeny operations, such as low-level finite field arithmetic, point addition, or isogeny computations. The controller executes a sequence of instructions to facilitate data into and out of the ALU to execute the computational core's supported isogeny and point operations. This sequence of instructions can be any form of static memory or dynamic memory, whether it is read from a read-only memory unit, random access memory unit, flip-flops, or internally stored values.

A further embodiment of this invention specifies that the primary computational core can also perform one or more isogeny evaluations within the large-degree isogeny operation. Within the large-degree isogeny operation, an isogeny evaluation is required to translate an elliptic curve point to its new representation on the isogenous curve. If this point is to be used for the immediate follow-up isogeny computation, then it may be beneficial to compute this isogeny evaluation on the primary computational core. An additional perspective of this invention is that, in a large-degree isogeny operation's strategy, this point may also be the one of least order, such that it is already closest to the order needed for the isogeny computation.

A further embodiment of this invention is to also use the secondary core to perform point multiplications within the large-degree isogeny operation. Here, the capability to perform the scalar point multiplication allows more freedom and flexibility in the strategy for the large-degree isogeny operation, allowing a secondary core to offload more of the computations that a primary core would have otherwise performed. One additional advantage is the creation of pivot points that can be used to efficiently traverse the large-degree isogeny operation's tree structure. A further interpretation of this invention is to apply an isogeny evaluation to this pivot point.

Figure 6:
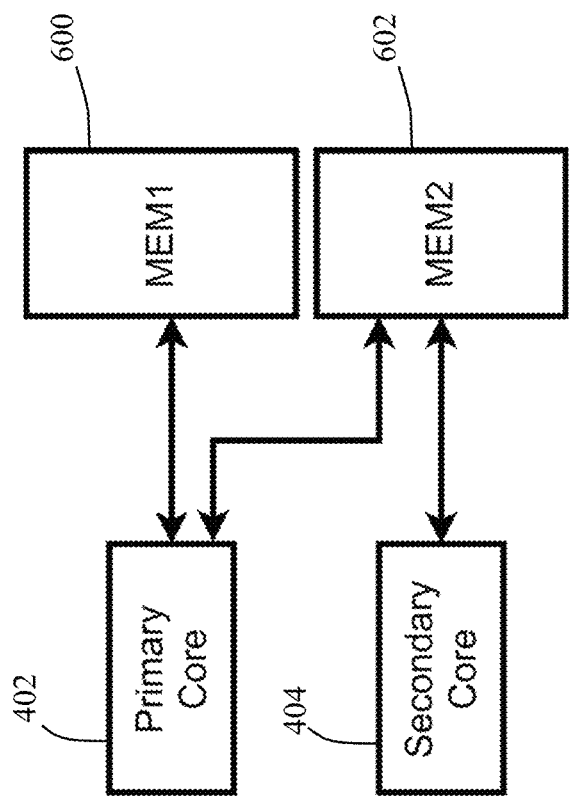
FIG. 6 is a schematic diagram depicting one interpretation of this invention where multiple memory units are used to store intermediate results. The primary core can access all memory units and each secondary core can only access one memory unit.
Figure 7:
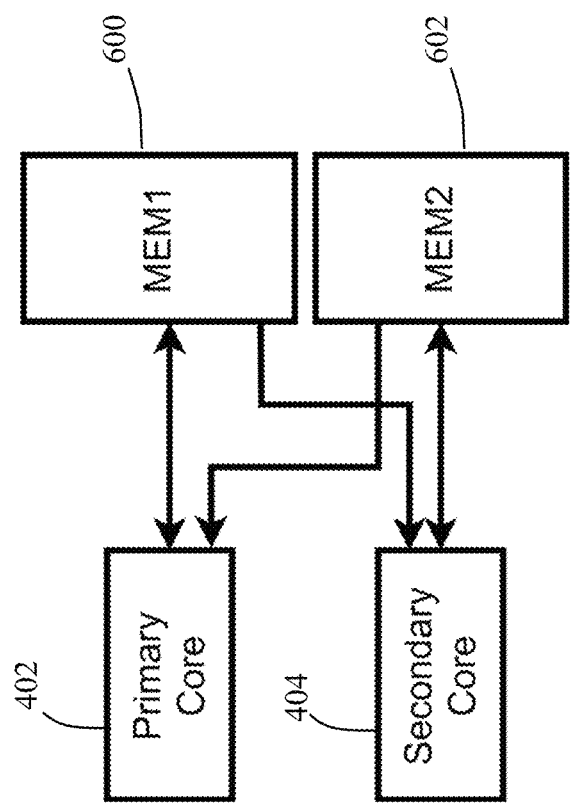
FIG. 7 is a schematic diagram depicting a further embodiment of this invention where multiple memory units are used to store intermediate results. Here, each computational core can write and read to its own memory unit, while each computational core may only be able to read from other memory units.

Another embodiment of this invention is the view of the memory that is shared between the primary and secondary computational cores 402, 404. The simplest memory is a shared memory between the primary and secondary cores 402, 404, allowing each core to freely read or write to the shared memory. This memory as with any other prescribed memories can be any kind of read-only memory, random access memory, flip-flops, or internal storage that is used to read and write values used in the large-degree isogeny. This invention covers any memory configuration intended to complete the large-degree isogeny operation. For instance, if there are multiple memory units 600, 602 between the primary and secondary cores 402, 404, then there are many different types of configurations. FIG. 6 and FIG. 7 illustrates two such example of multiple memory units with MEM1, 600, and MEM2, 602, which can be any combination of read-only memory, random access memory, flip-flops, or internal storage. FIG. 6 shows a simple system where the primary core 402 can read and write to both MEM1 and MEM2, but the secondary core 404 can only read and write to MEM2. Fewer connections here result in less interfacing and error handling between the memory units. The primary core can also connect to the memory unit used by the secondary core to easily initialize the correct data for use in the secondary core's operations. FIG. 7 shows another interpretation where the primary core can write to MEM1 and read from MEM1 and MEM2, while the secondary core can write to MEM2 and read from MEM1 and MEM2. This configuration may be beneficial as the secondary core can now read the memory used by the primary core to initiate the secondary core's sequence of instructions. In general, this invention covers any such memory configurations that are shared among the primary and secondary computational cores.

As a further embodiment of this invention is that the relative performance of the primary and secondary cores may not be equal. For instance, if the ALU of the primary core can perform computations in fewer cycles than the ALU of the secondary core, then there is a difference in performance. Said another way, the ALU in the secondary computational core 404 has a performance different from a performance of the ALU in the primary computational core 402. One such example for isogenies on elliptic curves could be low-level finite field multiplication. Here, a primary core may compute a field multiplication in 100 cycles and a secondary core may compute a field multiplication in 200 cycles, resulting in a performance gap that leads to a different selection of a large-degree isogeny strategy.

A final architecture embodiment of this invention is that this architecture is used on a computer processing system to compute a large-degree isogeny for an isogeny-based cryptosystem for an electronic computing device. There are many examples of isogeny-based cryptosystems intended to provide key establishment, digital signatures, and so on. The view of this embodiment covers such uses.

FIGS. 2-7 will be described in conjunction with the process flow chart of FIG. 8. Although FIG. 8 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 8 for the sake of brevity. In some embodiments, some or all of the process steps included in FIG. 8 can be combined into a single process. An exemplary computer-implemented method for computing large-degree isogenies may begin at step 800 and immediately proceed to the step of providing at least one computer processor resident on an electronic computing device with a primary computational core and at least one secondary computational core 802.

Next, step 804 includes performing with the at least one processor a large-degree isogeny operation by chaining together a plurality of scalar point multiplications, a plurality of isogeny computations, and a plurality of isogeny evaluations. Additionally, the process includes performing the large-degree isogeny operation as part of an isogeny-based cryptosystem utilizing the computer processor resident on the electronic computing device. Next, step 806 includes performing with the primary computational core 402 the plurality of scalar point multiplications in the large-degree isogeny operation and the plurality of isogeny computations in the large-degree isogeny operation.

In one embodiment, the process includes performing with the primary computational core 402 at least one of the plurality of isogeny evaluations in the large-degree isogeny operation. Further, the process includes generating a plurality of pivot points each respectively utilized as an input in the plurality of isogeny evaluations in the large-degree isogeny operation. Next, the process may proceed to the step of performing with the primary computational core 402 one of the at least one of the plurality of isogeny evaluations on a lowest elliptic curve point order of the plurality of pivot points in the large-degree isogeny operation.

Further, step 808 includes performing with the one or more secondary computational cores 404 a plurality of isogeny evaluations in the large-degree isogeny operation. Additionally, the process may proceed to the step of performing with the at least one secondary computational core 404 at least one of the plurality of scalar point multiplications in the large-degree isogeny operation. Next, the process may include generating with the at least one of the plurality of scalar point multiplications in the large-degree isogeny operation at least one pivot point utilized as an input in at least one of the plurality of isogeny evaluations in the large-degree isogeny operation.

In accordance with another embodiment, the process includes storing intermediate values within the large-degree isogeny operation from the primary and secondary computational cores 402, 404 in one or more memory units 600, 602 that are operably and communicatively coupled to the primary and secondary computational cores 402, 404. Additionally, the process includes storing intermediate values within the large-degree isogeny operation from the primary computational core 402 in a first memory unit 600 operably and communicatively coupled to the primary computational core 402, storing intermediate values within the large-degree isogeny operation from the secondary computational core 404 in a second memory unit 602 operably and communicatively coupled to the secondary computational core 404, and exchanging data between the first and second memory units 600, 602. Said another way, the same intermediate values may be stored within the first memory unit 600 or another memory unit. The process may terminate at step 810. Said differently, the first memory unit 600 and the second memory unit 602 may also be both operably configured to exchange data between each other, whether it is through the computational cores 402, 404, a non-computational core, directly, or other potential methods or structures.

What is claimed is:

1. A computer processing system for computing large-degree isogenies comprising:
    at least one computer processor resident on an electronic computing device and operably configured to execute computer-readable instructions programmed to perform a large-degree isogeny operation by chaining together a plurality of scalar point multiplications, a plurality of isogeny computations, and a plurality of isogeny evaluations, the at least one computer processor having a plurality of computational cores each with an arithmetic logic unit operably configured to perform computations within the large-degree isogeny and with a controller operably configured to execute a sequence of core computer-readable instructions to feed data into and out of the arithmetic logic unit in each respective plurality of computational cores, the plurality of computational cores including:
        a primary computational core operably configured to perform the plurality of scalar point multiplications in the large-degree isogeny operation and the plurality of isogeny computations in the large-degree isogeny operation; and
        at least one secondary computational core operably configured to perform the plurality of isogeny evaluations in the large-degree isogeny operation, the controller operably configured to cause simultaneous performance, and interleaving in the large-degree isogeny operation, of at least one of the plurality of scalar point multiplications performed by the primary computational core and of the plurality of isogeny evaluations performed by the at least one secondary computational core.

2. The computer processing system according to claim 1, wherein:
    the primary computational core is operably configured to perform at least one of the plurality of isogeny evaluations in the large-degree isogeny operation.

3. The computer processing system according to claim 2, wherein the plurality of isogeny evaluations further comprise:
    a plurality of pivot points each respectively utilized as an input in the plurality of isogeny evaluations in the large-degree isogeny operation, wherein the primary computational core is operably configured to perform one of the at least one of the plurality of isogeny evaluations on a lowest elliptic curve point order of the plurality of pivot points in the large-degree isogeny operation.

4. The computer processing system according to claim 1, wherein
    the at least one secondary computational core is operably configured to perform at least one of the plurality of scalar point multiplications in the large-degree isogeny operation.

5. The computer processing system according to claim 4, wherein:
    the at least one of the plurality of scalar point multiplications in the large-degree isogeny operation generates at least one pivot point utilized as an input in at least one of the plurality of isogeny evaluations in the large-degree isogeny operation.

6. The computer processing system according to claim 1, wherein the at least one computer processor further comprises:
    at least one memory unit operably and communicatively coupled to the plurality of computational cores and operably configured to store intermediate values within the large-degree isogeny operation from the plurality of computational cores.

7. The computer processing system according to claim 1, wherein the at least one computer processor further comprises:
    a first memory unit operably and communicatively coupled to the primary computational core and operably configured to store intermediate values within the large-degree isogeny operation from the primary computational core; and
    a second memory unit operably and communicatively coupled to the secondary computational core and operably configured to store intermediate values within the large-degree isogeny operation from the secondary computational core, wherein the first memory unit and the second memory unit are both operably configured to exchange data between each other.

8. The computer processing system according to claim 1, wherein:
    the arithmetic logic unit in the at least one secondary computational core has a performance different from a performance of the arithmetic logic unit in the primary computational core.

9. The computer processing system according to claim 1, wherein:
    the large-degree isogeny operation is performed as part of an isogeny-based cryptosystem utilizing the computer processor resident on the electronic computing device.

10. A computer-implemented method for computing large-degree isogenies comprising the steps of:
    providing at least one computer processor resident on an electronic computing device with a primary computational core and at least one secondary computational core;
    performing with the at least one processor a large-degree isogeny operation by chaining together a plurality of scalar point multiplications, a plurality of isogeny computations, and a plurality of isogeny evaluations;
    performing with the primary computational core the plurality of scalar point multiplications in the large-degree isogeny operation and the plurality of isogeny computations in the large-degree isogeny operation;
    performing with the at least one secondary computational core a plurality of isogeny evaluations in the large-degree isogeny operation; and interleaving at least one of the plurality of scalar point multiplication performed by the primary computational core with at least one of the plurality of isogeny evaluations performed by the secondary computational core in the large-degree isogeny operation.

11. The computer-implemented method according to claim 10, further comprising:
performing the large-degree isogeny operation as part of an isogeny-based cryptosystem utilizing the computer processor resident on the electronic computing device.

12. The computer-implemented method according to claim 10, further comprising:
performing with the primary computational core at least one of the plurality of isogeny evaluations in the large-degree isogeny operation.

13. The computer-implemented method according to claim 12, further comprising:
generating a plurality of pivot points each respectively utilized as an input in the plurality of isogeny evaluations in the large-degree isogeny operation; and
performing with the primary computational core one of the at least one of the plurality of isogeny evaluations on a lowest elliptic curve point order of the plurality of pivot points in the large-degree isogeny operation.

14. The computer processing system according to claim 10, further comprising
performing with the at least one secondary computational core at least one of the plurality of scalar point multiplications in the large-degree isogeny operation.

15. The computer-implemented method according to claim 14, further comprising:
generating with the at least one of the plurality of scalar point multiplications in the large-degree isogeny operation at least one pivot point utilized as an input in at least one of the plurality of isogeny evaluations in the large-degree isogeny operation.

16. The computer-implemented method according to claim 10, further comprising:
storing intermediate values within the large-degree isogeny operation from the primary and secondary computational cores in at least one memory unit that is operably and communicatively coupled to the primary and secondary computational cores.

17. The computer-implemented method according to claim 10, further comprising:
storing intermediate values within the large-degree isogeny operation from the primary computational core in a first memory unit operably and communicatively coupled to the primary computational core;
storing intermediate values within the large-degree isogeny operation from the secondary computational core in a second memory unit operably and communicatively coupled to the secondary computational core; and
exchanging data between the first and second memory units.

* * * * *